United States Patent
Nguyen et al.

(10) Patent No.: US 11,404,049 B2
(45) Date of Patent: Aug. 2, 2022

(54) INTERACTIVE AUGMENTATION AND INTEGRATION OF REAL-TIME SPEECH-TO-TEXT

(71) Applicant: Microsoft Technology Licensing, LLC, Redmond, WA (US)

(72) Inventors: Dana Minh Nguyen, San Jose, CA (US); Rohail Mustafa Syed, Coppell, TX (US); Alisa Marilyn Bacon, Seattle, WA (US); William Duncan Lewis, Seattle, WA (US); Michael Tholfsen, Newcastle, WA (US); Carly Larsson, Lompoc, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 268 days.

(21) Appl. No.: 16/707,891

(22) Filed: Dec. 9, 2019

(65) Prior Publication Data
US 2021/0174787 A1 Jun. 10, 2021

(51) Int. Cl.
*G10L 15/00* (2013.01)
*G10L 15/16* (2006.01)
(Continued)

(52) U.S. Cl.
CPC ............ *G10L 15/16* (2013.01); *G06F 3/0481* (2013.01); *G06F 3/0486* (2013.01); *G06F 3/167* (2013.01); *G06F 40/58* (2020.01); *G10L 15/22* (2013.01)

(58) Field of Classification Search
CPC ......... G06F 40/279; G06F 40/35; G10L 15/26
See application file for complete search history.

(56) References Cited

U.S. PATENT DOCUMENTS 5,884,258 A * 3/1999 Rozak ..................... G10L 15/22
704/251
6,816,468 B1 11/2004 Cruickshank
(Continued)

FOREIGN PATENT DOCUMENTS

WO 2013122909 A1 8/2013

OTHER PUBLICATIONS

"International Search Report and Written Opinion Issued in PCT Application No. PCT/US20/059136", dated Feb. 24, 2021, 11 Pages.

(Continued)

*Primary Examiner* — Daniel Abebe

(57) ABSTRACT

In non-limiting examples of the present disclosure, systems, methods and devices for integrating speech-to-text transcription in a productivity application are presented. A request to access a real-time speech-to-text transcription of an audio signal that is being received by a second device is sent by a first device. The real-time speech-to-text transcription may be surfaced in a transcription pane of a productivity application on the first device. A request to translate the transcription to a different language may be received. The transcription may be translated in real-time and surfaced in the transcription pane. A selection of a word in the surfaced transcription may be received. A request to drag the word from the transcription pane and drop it in a window in the productivity application outside of the transcription pane may be received. The word may be surfaced in the window in the productivity application outside of the transcription pane.

20 Claims, 16 Drawing Sheets

(51) Int. Cl.
  *G06F 40/58* (2020.01)
  *G06F 3/0481* (2022.01)
  *G06F 3/0486* (2013.01)
  *G06F 3/16* (2006.01)
  *G10L 15/22* (2006.01)

(56) References Cited

U.S. PATENT DOCUMENTS

| | | | |
|---|---|---|---|
| 8,140,341 B2 | 3/2012 | Faisman et al. | |
| 8,792,863 B2 * | 7/2014 | De Oliveira | H04M 3/42221 |
| | | | 455/412.1 |
| 9,236,047 B2 | 1/2016 | Rasmussen | |
| 10,409,903 B2 | 9/2019 | Krasadakis | |
| 10,417,349 B2 | 9/2019 | Lewis et al. | |
| 2002/0062214 A1 * | 5/2002 | Hanson | G10L 13/00 |
| | | | 704/260 |
| 2004/0138894 A1 * | 7/2004 | Kiecza | G10L 15/28 |
| | | | 704/277 |
| 2014/0099076 A1 * | 4/2014 | Li | H04N 5/92 |
| | | | 386/244 |
| 2015/0149540 A1 | 5/2015 | Barker et al. | |
| 2019/0259387 A1 | 8/2019 | Mertens et al. | |
| 2021/0056251 A1 * | 2/2021 | Parmar | G06F 40/169 |
| 2021/0216200 A1 * | 7/2021 | Strader | G06F 3/04855 |

OTHER PUBLICATIONS

"Live Captions (CART)", Retrieved from: https://www.ai-media.tv/products/live-content/live-captions-cart/, Retrieved Date: Dec. 13, 2019, 13 Pages.

"Live Transcribe", Retrieved from: https://web.archive.org/web/20190716171908/https:/play.google.com/store/apps/details?id=com.google.audio.hearing.visualization.accessibility.scribe&hl=en, Jul. 16, 2019, 6 Pages.

"OneNote for students", Retrieved from: https://web.archive.org/web/20190402111639/http:/onenoteineducation.com/en-US/students/, Apr. 2, 2019, 2 Pages.

"Otter Voice Meeting Notes", Retrieved from: https://web.archive.org/web/20190712112544/https:/play.google.com/store/apps/details?id=com.aisense.otter, Jul. 12, 2019, 7 Pages.

Duerstock, et al., "Assistive Notetaking Using Speech Recognition Technology", In Proceedings of Festival of International Conferences on Caregiving, Disability, Aging and Technology, Jun. 5, 2011, 4 Pages.

Lasecki, et al., "Helping Students Keep Up with Real-Time Captions by Pausing and Highlighting", In Proceedings of the 11th Web for All Conference, Apr. 7, 2014, 8 Pages.

Ranchal, et al., "Using Speech Recognition for Real-Time Captioning and Lecture Transcription in the Classroom", in Journal of IEEE Transactions on Learning Technologies, vol. 6, Issue 4, Oct. 2013, pp. 299-311.

Shadiev,, et al. , "Review of Speech-to-Text Recognition Technology for Enhancing Learning", In Journal of Educational Technology & Society, vol. 17, Issue 4, Oct. 1, 2014, pp. 65-84.

Wald, et al., "Synote: Collaborative Mobile Learning for All", In Journal of Procedia Computer Science, vol. 27, Jan. 1, 2014, pp. 240-250.

White, et al., "An Architecture for Real-time Lecture Transcription and Collaborative Annotation using Mobile Devices", In Proceedings of Society for Information Technology & Teacher Education International Conference, Mar. 25, 2013, 5 Pages.

* cited by examiner

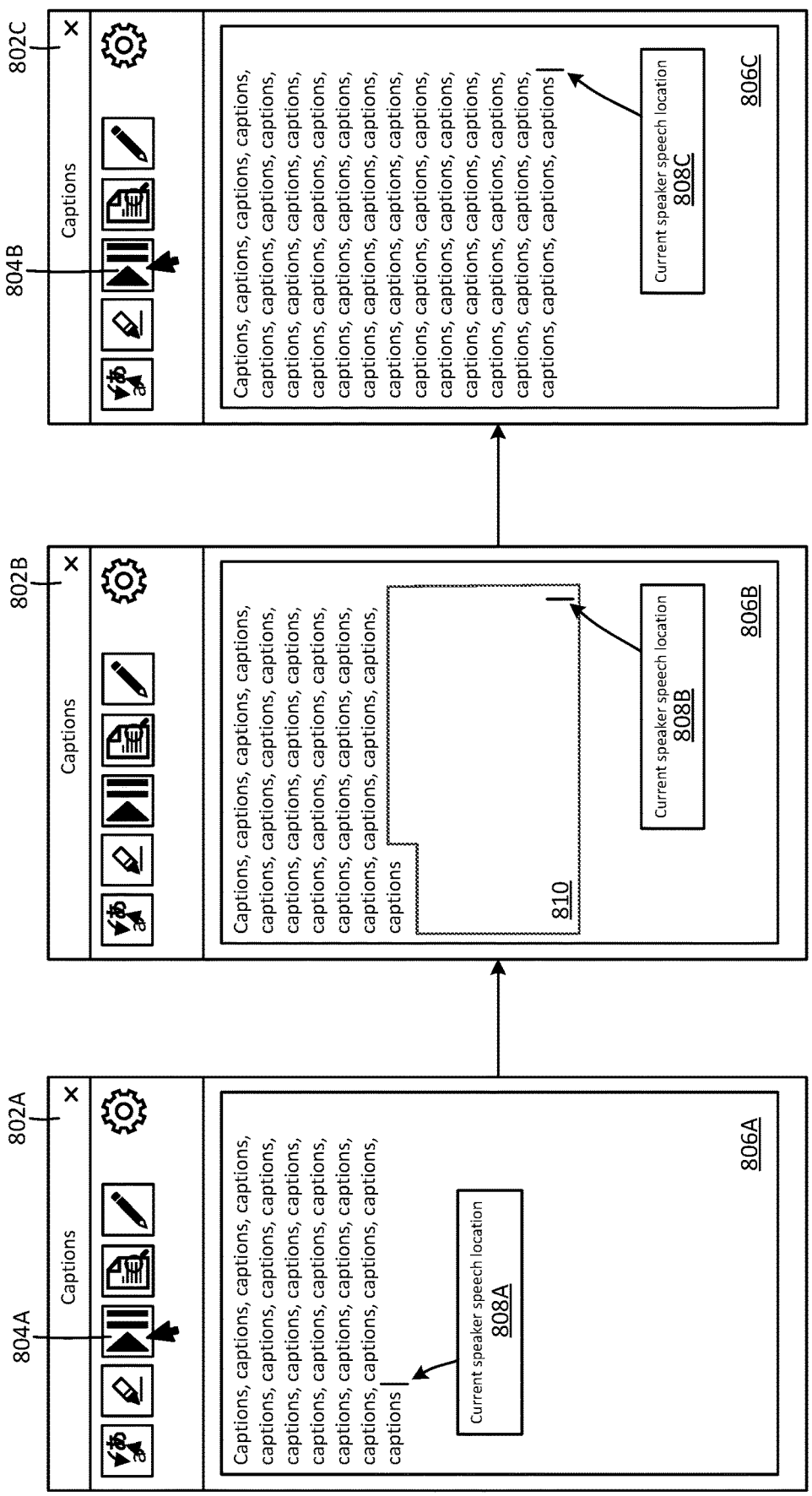

INTERACTIVE AUGMENTATION AND INTEGRATION OF REAL-TIME SPEECH-TO-TEXT

BACKGROUND

It is often difficult for users to listen to a speech (e.g., a lecture) while also taking notes related to that lecture. This may be the case for various reasons. For example, a user may be unfamiliar with the speech subject matter, have auditory learning issues, have hearing issues, and/or language issues (e.g., the speech is not in the user's first language). Captions are an excellent mechanism for improving the ability of users to understand content. However, even if captions are available during a live presentation, they are difficult to follow or interact with while performing one or more additional tasks (e.g., note taking).

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for integrating speech-to-text transcription in a productivity application. A join code generation request may be received from a computing device associated with a speaking user. The request may be received by a real-time speech-to-text service. The real-time speech-to-text service may generate a join code and send it to the computing device associated with the speaking user. An audio signal comprising speech may be received by the computing device associated with the speaking user. The audio signal may be sent to real-time speech-to-text service, where it may be transcribed.

A computing device associated with a joining user may request access to the transcription while it is being generated (e.g., the transcription instance). The request may comprise the join code that was generated by the real-time speech-to-text service. Once authenticated, the transcription may be surfaced in real or almost real time in a transcription pane in a productivity application associated with the joining user. Various actions may be performed in association with the transcription, the productivity application, other applications, and/or combinations thereof. In some examples, content in the transcription pane may be highlighted and/or annotated. Content from the transcription pane may be moved (e.g., via drag and drop) from the transcription pane to another window (e.g., a notebook window, a note taking window) of the productivity application. Definitions may be surfaced for words and phrases in the transcription pane. Web searches associated with words and phrases in the transcription pane may be automatically performed. In some examples, a pause function of the transcription pane may be utilized to pause incoming captions for a transcription instance. The captions that are held back during the pause may then be surfaced upon resuming the transcription instance. In additional examples, the transcription pane may include selectable options for translating a transcription from a first language to one or more additional languages. The real-time speech-to-text service and/or a translation service may process such a request, translate the transcription and/or the audio signal while it is being received, and send the translation to the joining user's computing device where it may be surfaced in the transcription pane.

BRIEF DESCRIPTION OF THE DRAWINGS

Non-limiting and non-exhaustive examples are described with reference to the following figures:

FIG. 8 illustrates selectable elements and related actions associated with the pausing and resuming of real-time speech-to-text captions in a transcription pane of a productivity application.

DETAILED DESCRIPTION

Figure 1:
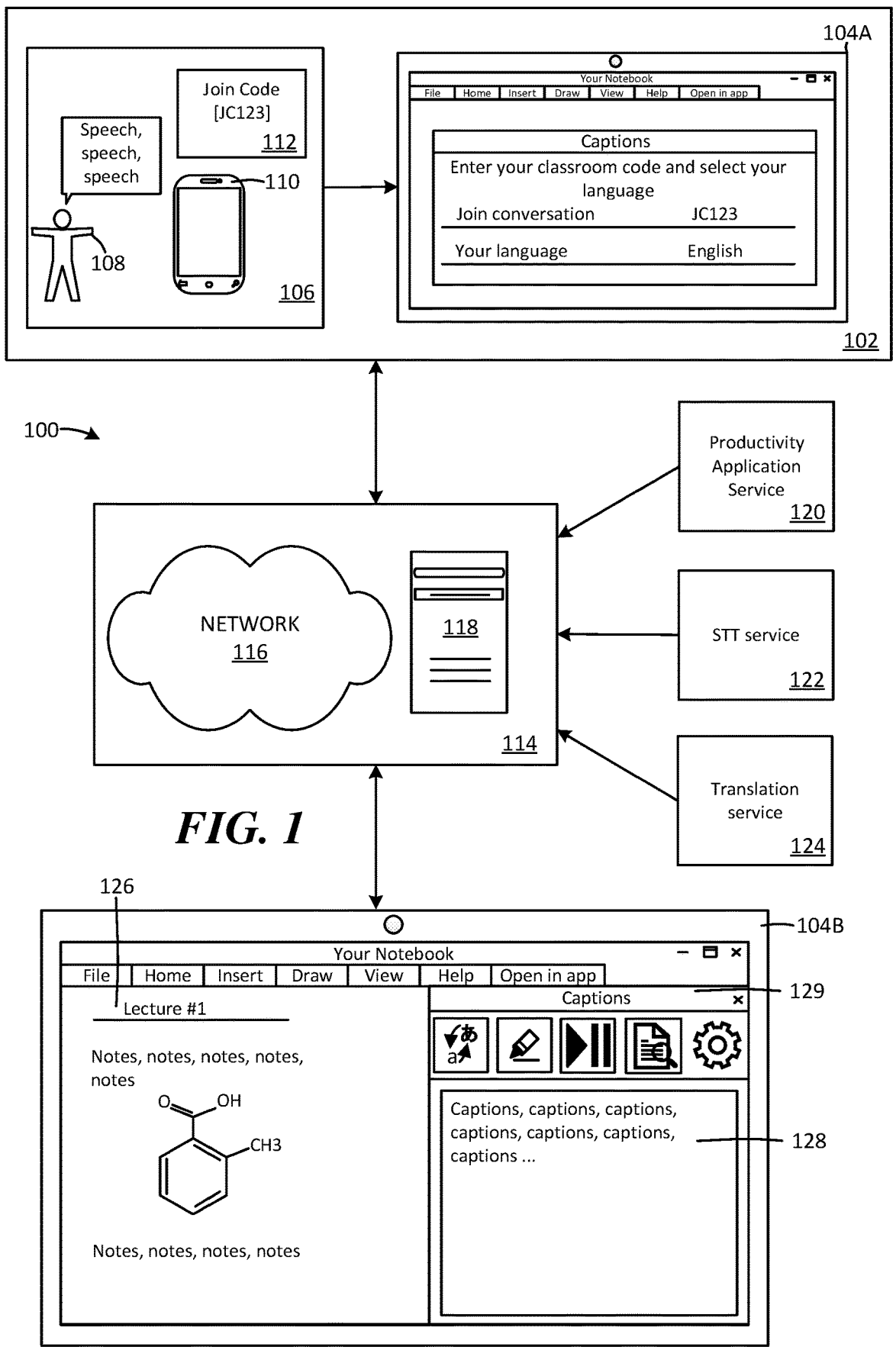
FIG. 1 is a schematic diagram illustrating an example distributed computing environment for integrating speech-to-text transcription in a productivity application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for integrating speech-to-text transcription in a productivity application. According to examples, a first user (i.e., the speaking user) that would like to start a transcription instance that may be accessed by one or more other users may initiate that instance on a computing device. The request to initiate the transcription instance may be received by a real-time text-to-speech service, which may generate a join code that can be used by one or more other users and associated computing devices to join the transcription instance.

The join code may be sent to users and/or user accounts that the speaking user would like to give access to the transcription instance. In some examples, the join code may be sent electronically back to the computing device associated with the first user. The first user may then provide the join code to the other users via various means (e.g., write it on a whiteboard, email it, put it on a shared website, etc.). In other examples, the join code may be automatically sent electronically to one or more user accounts (e.g., user accounts associated with a class list serve, provided via an SMS message, etc.). In additional examples, a device or a first user account may be authorized to receive transcriptions associated with a different device or user account (e.g., via a cached token), and there may be a selectable option surfaced on a device associated with the first user account to join a transcription instance that is authorized when it is initiated. Thus, a joining user may not need to manually enter a new join code every time a new transcription instance is to be joined.

When a joining user enters the join code on the joining user's computing device, a productivity application with a transcription pane that includes a real-time transcription of the transcription instance for the speaking user may be surfaced. That is, the join code may be sent to the real-time speech-to-text transcription service where the code is authenticated, and the real-time speech-to-text transcription service may then begin sending transcription information from the transcription instance to the joining user's computing device. The join code may be entered into the productivity application or in a separate interface on the computing device. The productivity application may comprise one or more of: a note taking application, a notebook application, a word processing application, a presentation application, a task completion application, a spreadsheet application, and/or a messaging application, for example.

The transcription pane may include a plurality of selectable elements for performing a plurality of actions. A first element may be selected for highlighting content (e.g., captions, notes) in the transcription pane and/or moving that content from the transcription pane into a second window of the productivity application that includes that transcription pane. The second window may comprise a note taking window, a journal window, or a presentation window, for example. A second element may be selected for changing the language that the transcription is surfaced in. A third element may be selected for adding annotations to the transcription and/or adding annotations to specific content in the transcription. A fourth element may be selected for surfacing a definition associated with a word or phrase in the transcription. A fifth element may be selected for performing a web search related to a word or phrase in the transcription. A sixth element may be selected for adding a link, or a pin, that will be associated with one or more words in the transcription. A seventh element may be selected for pausing and resuming the surfacing of content in the transcription. That is, the seventh element may pause the surfacing of captions for a current transcription instance, and when resumed, the backlog of captions may be caused to be surfaced in the transcription pane.

According to examples, a transcription surfaced in a transcription pane of a productivity application may be automatically saved to a transcription section of the productivity application. Thus, in an example where the productivity application is a notebook application or a note taking application with a plurality of sections, each new transcription may be saved by default to a transcription section of the notebook application or the note taking application. In such a manner, all of the transcriptions associated with a user account may be accessed in a single location. In some examples, each transcription may be saved to a section of a corresponding productivity application with a date and/or time that the transcription was generated and/or completed. In additional examples, one or more natural language processing models may be applied to a transcription. Those one or more natural language processing models may be trained to identify one or more subject matter types associated with the transcription. A transcription may thus be saved to a location in a productivity application corresponding to one or more identified subject matter types (e.g., in a "biology" transcriptions section of a notebook application, in a "chemistry" transcriptions section of a notebook application, in a class type and/or number of a notebook application). In additional examples, users may customize locations where transcriptions are saved.

The systems, methods, and devices described herein provide technical advantages for integrating real-time speech-to-text transcription in productivity applications. Providing mechanisms for automatically surfacing a real-time transcription of a speaking user in association with a productivity application and augmenting that surfacing with note taking features also provides an enhanced user experience. For example, a user may take notes related to a speech (e.g., a lecture) in a first window of a productivity application, while having a real-time transcription of the speech surfaced next to that window. The user may then highlight the transcription text, drag and drop content from the transcription in the user's notes, link the notes to the transcription, annotate the transcription, surface standard definitions and custom definitions for words in the transcription, and pause and resume the transcription at will. Automated web searches related to words and phrases in the transcription and providing the ability to link most relevant content from those web searches to the words and phrases in the transcription also enhances the user experience and reduces manual searches.

FIG. 1 is a schematic diagram illustrating an example distributed computing environment 100 for integrating speech-to-text transcription in a productivity application. Computing environment 100 includes transcription sub-environment 102, network and processing sub-environment 114, and computing device 104B. Network and processing sub-environment 114 may include and/or communicate with productivity application service 120, SST service 122, and/or translation service 124. Any and all of the devices described herein may communicate with one another via a network, such as network 116 in network and processing sub-environment 114.

Transcription sub-environment 102 includes speaking environment 106 and computing device 104A. In speaker environment 106 computing device 110 is in communication with a real-time speech-to-text service (e.g., STT service 122) in the cloud. In this example computing device 110 is a smart phone. However, computing device 110 may be any computing device that includes, or that can receive signals from, a microphone (e.g., a laptop, a desktop, a tablet, a smart watch). Computing device 110 may communicate with STT service 122 via a specific STT application, via an application that includes an add-in associated with the STT application, via a web browser, or other communication means (e.g., a speech translation service application, via a secondary device and/or application, etc.). Computing device 110 may additionally utilize an API to communicate with STT service 122.

In this example, a request to generate a join code for a voice transcription has been received by computing device 110. For example, user 108 may utilize an application executed on computing device 110 to input a generate code request and that generate code request may be processed by one or both of computing device 110 and/or STT service 122. The processing of the request may comprise generating a join code that can be utilized by other devices and/or applications to join a real-time voice speech-to-text instance that is active from computing device 110 (e.g., the audio being received by computing device 110 and the transcription of that audio being performed in the cloud). The join code may comprise one or more characters, a QR code, a barcode, or a different code type that provides access to the active instance of the speech-to-text instance. In this example, the join code that has been generated is join code 112 [JC123].

Speaking user 108 speaks and that audio signal is received by computing device 110. Computing device 110 sends the audio signal to STT service 122. STT service 122 analyzes the audio signal and generates a textual transcription based on that analysis. The analysis that may be performed in generating the textual transcription is described in more detail below in relation to FIG. 2. The transcription may be performed in a language in which the audio was originally received (e.g., if speaking user 108 is speaking in English that audio may be initially transcribed by STT service 122 in English). In examples, translation service 124 may translate the transcription to one or more other languages that the audio was not originally received in. In some examples, the transcription of the audio from the original language may be translated by translation service 124. In other examples, the original audio may be directly transcribed into one or more additional languages. Additional details related to the processing performed by translation service 124 are provided below in relation to FIG. 2.

Information included in productivity application service 120 may be utilized in processing the audio received from computing device 110, in augmenting a transcription or translation of that audio, and/or in augmenting or otherwise supplementing a transcription of that audio. As an example, productivity application service 120 may include a materials (e.g., lecture notes, presentation documents, quizzes, tests, etc.) associated with a lecture that speaking user 108 is giving and that information may be utilized in generating a custom dictionary and/or corpus used in generating the transcription of the audio received by computing device 110. In another example, productivity application service 120 may include transcription settings and/or translation settings associated with a user account related to computing device 104B, and captions and/or translations may be provided to computing device 126 according to those settings.

In this example, a productivity application is displayed on computing device 104A. Specifically, a productivity application for note taking is displayed and a captions window has been surfaced in that application for joining an ongoing lecture related to speaking user 108's speech/lecture and join code 112. Join code 112 is entered into the "join conversation" field of the captions window, and a user associated with computing device 104A has selected English as her preferred language for receiving a transcription of the transcription instance. Join code 112 is sent from computing device 104A to the real-time speech-to-text service, which authenticates the code and authorizes speech-to-text from speaking user 108's transcription instance to be provided to computing device 104A. In this example, the speech-to-text is sent to computing device 104B, which is the same computing device as computing device 104A, as illustrated by captions 128 in transcription pane 129. Transcription pane 129 is included in the note taking productivity application next to notes window 126 for "Lecture #1". For example, speaking user 108 may be a professor in organic chemistry providing her first lecture in the class, a transcription of that lecture may be automatically generated via STT service 122, and surfaced in transcription pane 129 in the notes taking application where the student user is taking notes related to the first lecture. Additional details related to various interactions that may be taken with regard to captions 128 are provided below.

Figure 2:
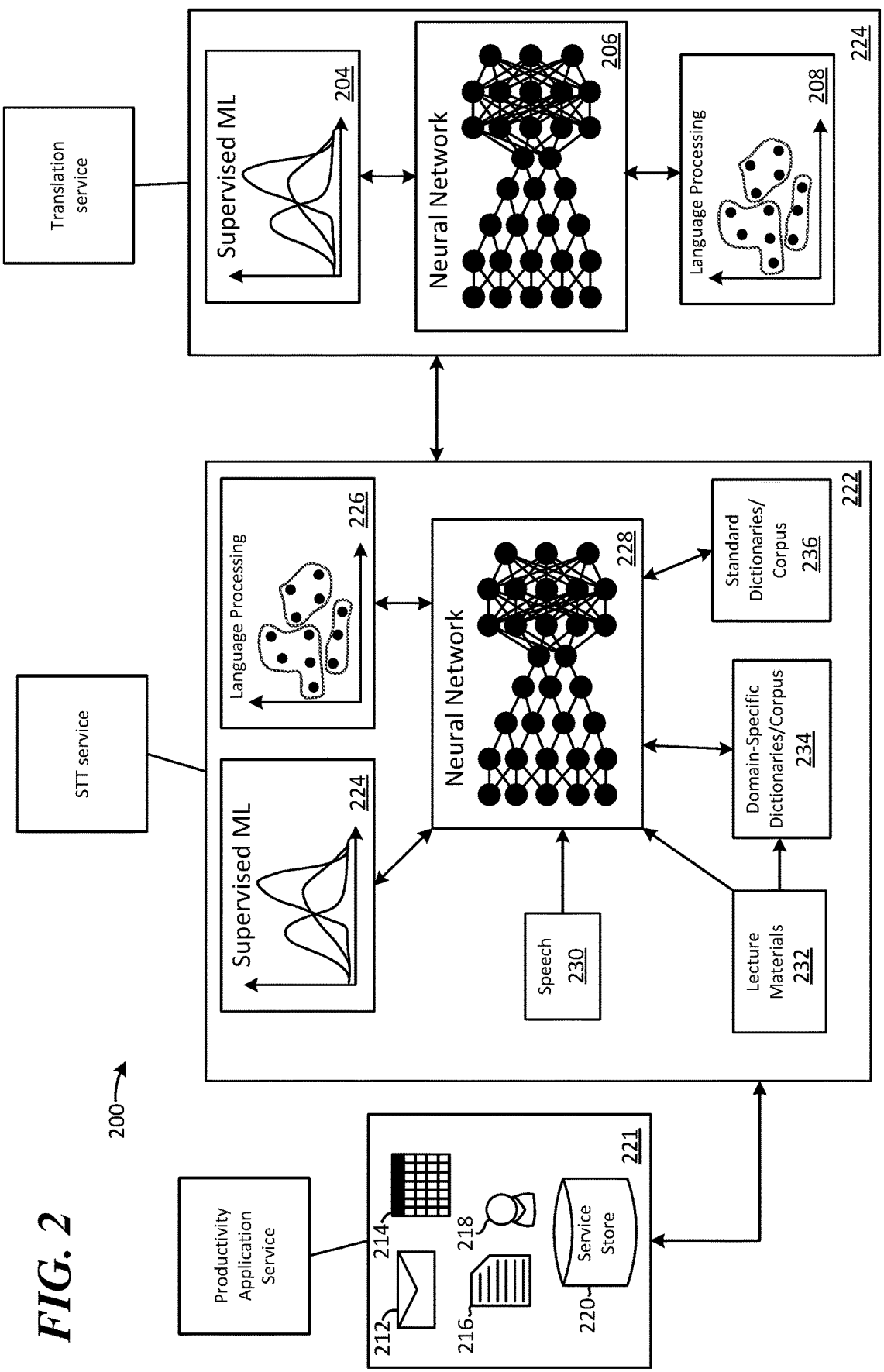
FIG. 2 illustrates exemplary elements of three cloud-based services that may be utilized in integrating speech-to-text transcription in a productivity application.

FIG. 2 illustrates exemplary elements of three cloud-based services 200 that may be utilized in integrating speech-to-text transcription in a productivity application. Cloud-based services include productivity application service 221, speech-to-text (STT) service 222, and translation service 224. One or more of those services may communicate with one another via a network such as network 116 in FIG. 1.

Productivity application service 221 includes service store 220, which may include stored data associated with one or more user accounts that are related to one or more productivity applications that are hosted by productivity application service 221. Those user accounts may additionally or alternatively be associated STT service 222, and/or translation service 224. In the illustrated example, service store 220 includes document data 216, which may include one or more stored productivity documents and/or associated metadata; email data 212 and associated email metadata; calendar data 214 and associated calendar metadata; and user settings 218, which may include privacy settings, language settings, locational preferences, and dictionary preferences, for example. In some examples, document data 216 may include lecture materials 232, which are discussed below in relation to STT service 222.

STT service 222 includes one or more speech-to-text language processing models. Those language processing models are illustrated by neural network 228, supervised machine learning model 224, and language processing model 226. In some examples, when a transcription instance has been initiated from a computing device that is receiving audio (e.g., computing device 110 in FIG. 1), the audio signal received from that device may be sent to STT service 222 where it is processed for transcription. The audio signal is represented by speech 230. Speech 230 may be provided to the one or more speech-to-text language processing models. As illustrated, the one or more speech-to-text language processing models may be trained and/or may utilize documents, such as lecture materials 232, in processing speech 230. For example, if the user that provides speech 230 is presenting a lecture with one or more corresponding documents related to the lecture (e.g., an electronic slide show from a presentation application on organic chemistry, a lecture handout, etc.), the language processing models used to transcribe speech 230 may utilize that material (e.g., via analysis of those electronic documents) to develop a custom corpus and/or dictionary that may be utilized in the language processing models in determining correct output for speech 230. This is illustrated by domain-specific dictionaries/corpus 234.

According to some examples, vocabulary (e.g., words, phrases) that is determined to be specific and/or unique to a particular language processing model, custom corpus, and/or custom dictionary, may be automatically highlighted and/or otherwise distinguished from other captions in a transcription pane in a productivity application. For example, if there are terms that are used in a specific discipline (e.g., organic chemistry, evolutionary biology, mechanical engineering, etc.) that are provided as captions in the transcription pane from transcribed audio, those terms may be highlighted, underlined, bolded, or otherwise indicated as being associated with a specific discipline.

In some examples, the documents/materials utilized in generating, augmenting, and/or for the processing of audio/speech in the language processing models may be associated with multiple users. For example, the electronic documents/materials from a first group of users (e.g., professors) in a first science department of a university may be utilized in the language processing models for speech received for users in that department, and the electronic documents/materials from a second group of users (e.g., professors) in a second science department of a university may be utilized in the language processing models for speech received from users in that department. Other electronic documents/materials from other groups may be utilized for processing of speech from users with similar vocabulary. The language processing models used to transcribe speech 230 may utilize standard dictionaries and or one or more standard corpus in determining correct output for speech 230. This is illustrated by standard dictionaries/corpus 236.

Translation service 224 may receive output (e.g., a transcription of speech 230) from STT service 222 and translate that output into one or more additional languages. Translation service 224 includes one or more language processing models that may be utilized in translating output received from STT service 222. Those models are illustrated by supervised machine learning model 204, neural network 206, and language processing model 208.

Figure 3:
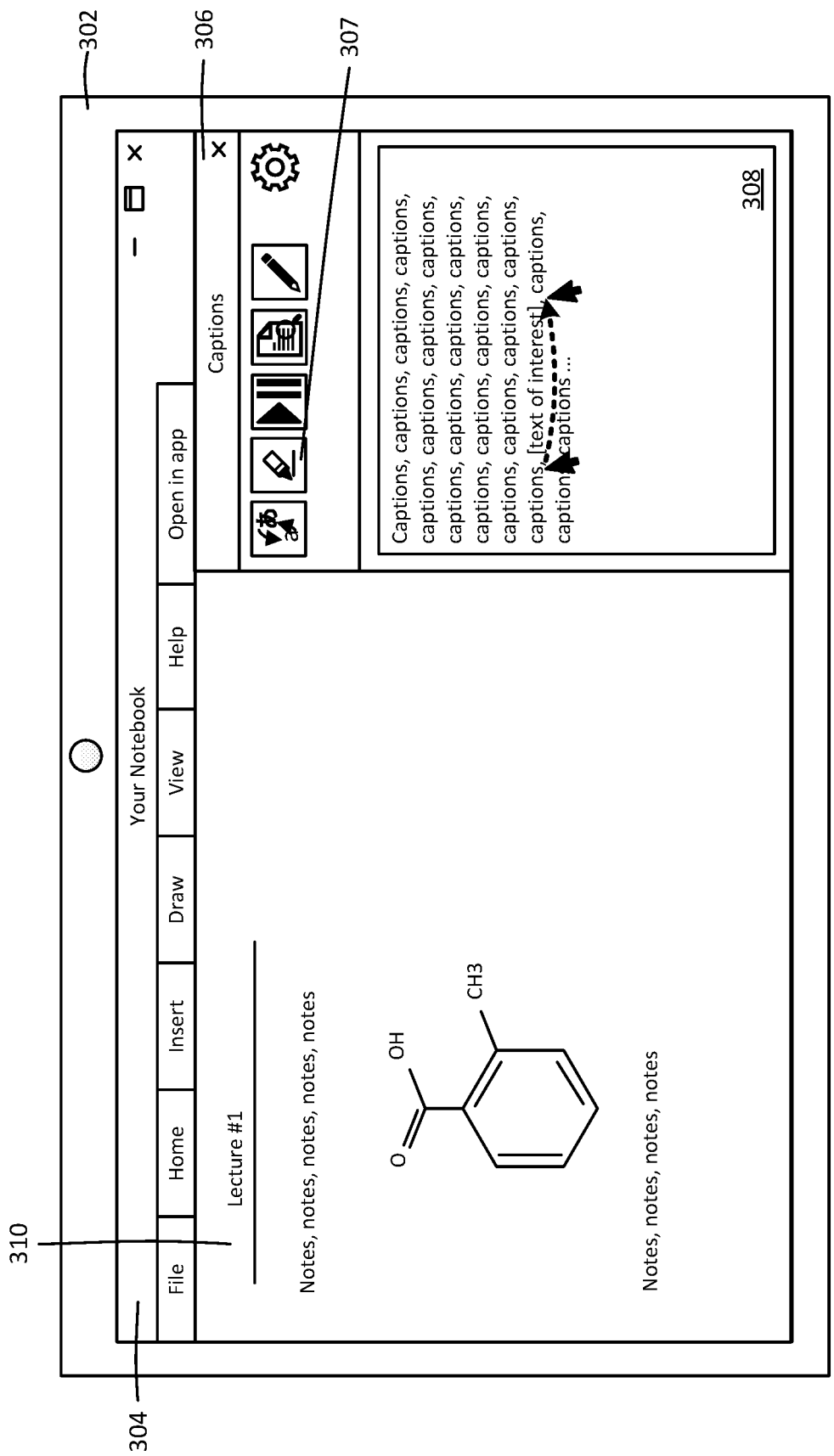
FIG. 3 illustrates an interaction with text in a transcription pane integrated in a productivity application.

FIG. 3 illustrates an interaction with text in a transcription pane integrated in a productivity application. FIG. 3 includes computing device 302, which displays productivity application 304. Productivity application 304 includes application notes 310 and transcription pane 306. Transcription pane 306 is integrated in productivity application 304 and includes captions 308. Captions 308 are surfaced in real or almost real-time in relation to the receiving of speech (e.g., via an audio signal) and subsequent processing of that audio signal into text. The text is then caused to be displayed as captions 308 in transcription pane 306.

In this example, a selection of one or more words in captions 308 has been made. The selection is illustrated as being made via a click and drag of a mouse from one side of the selected words to the other side of the selected words. However, it should be understood that other mechanisms for selecting captions in transcription pane 306 may be utilized (e.g., verbal command, touch input, etc.). Interaction with the selected captions is further described below.

In some examples, highlight element 307 in transcription pane 306 may be selected. That selection may cause a highlight element to be surfaced, which may be utilized to highlight text, such as the selected text of interest shown here. In some examples, a user may select from a plurality of colors that the text may be highlighted in. In additional examples, the highlighted and/or selected text may be interacted with as more fully described below.

Figure 4:
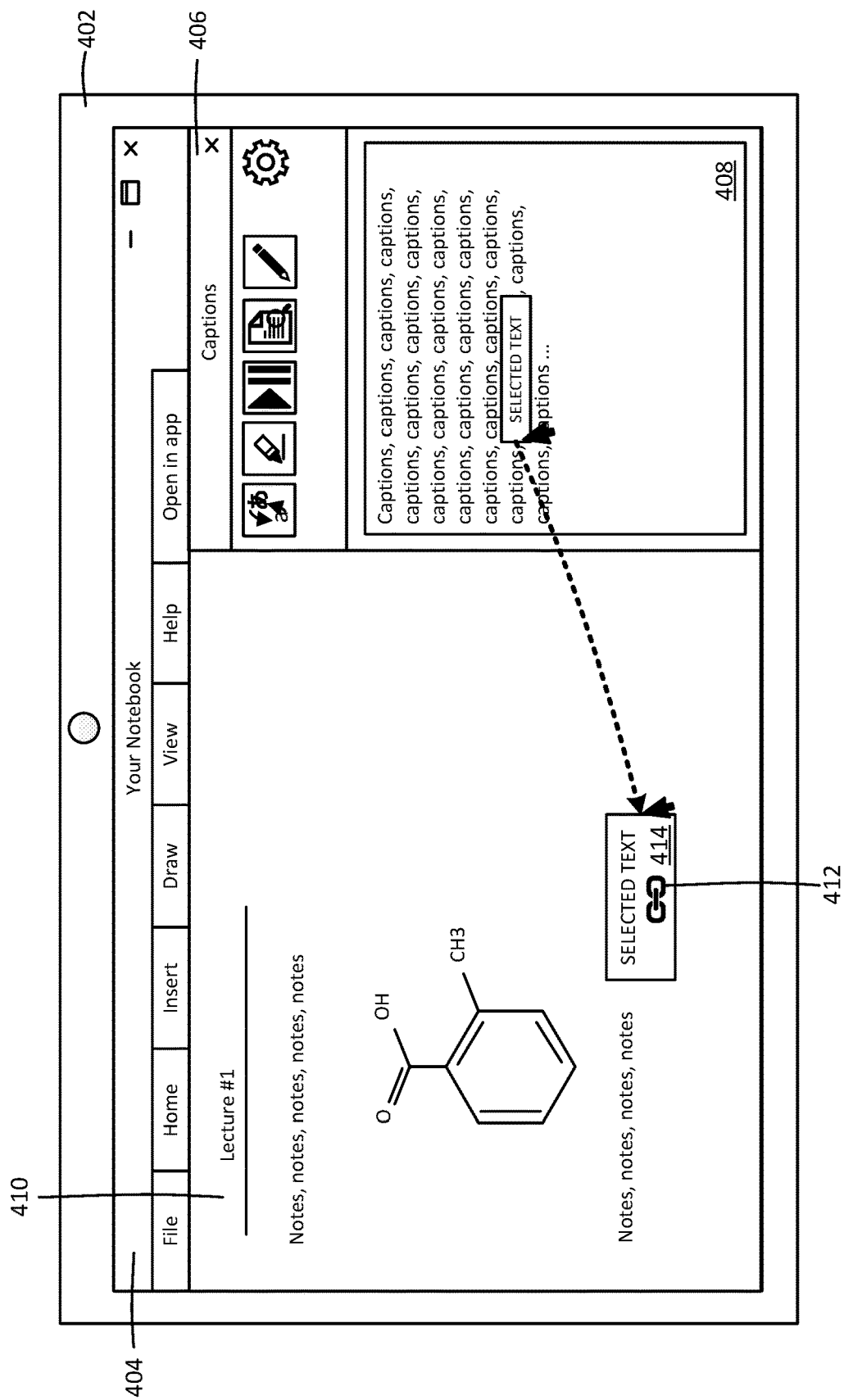
FIG. 4 illustrates the transfer of text in a transcription pane to a separate window in a productivity application.

FIG. 4 illustrates the transfer of text in a transcription pane to a separate window in a productivity application. FIG. 4 includes computing device 402, which displays productivity application 404. Productivity application 404 includes application notes 410 and transcription pane 406. Transcription pane 406 is integrated in productivity application 404 and includes captions 408. Captions 408 are surfaced in real or almost real-time in relation to the receiving of speech (e.g., via an audio signal) and subsequent processing of that audio signal into text. The text is then caused to be displayed as captions 408 in transcription pane 406.

In this example, a selection has been made of one or more words in captions 408. Those one or more words are illustrated as selected text 414. An indication to interact with selected text 414 has been made. Specifically, a click and drag of selected text 414 has been made, whereby a click is received in relation to selected text 414 in captions 408. A drag and drop mechanism is then made in relation to captions 408 to application notes 410. Selected text 414 may thus be inserted into a location in application notes 410 where it is dropped. In some examples, selected text 414 may be copied and pasted into application notes 410 via the drag and drop mechanisms. In other examples, selected text 414 may be transferred via a cut and paste type mechanism. In some examples, selected text 414 may be copied and stored in temporary storage on computing device 402 while it is being moved (e.g., via drag and drop) from transcription pane 406 to application notes 410. Additionally, in this example, when selected text 414 is inserted into application notes 410, it is associated with link 412. Link 412 may, if selected, cause the position of selected text 414 in captions 408 to be surfaced in transcription pane 406. In some examples, link 412 may be an embedded link. As an example where the link may be used, if a user does not currently have lecture notes corresponding to captions 408 displayed in transcription pane 406, and the user interacts with link 412, those lecture notes and/or the specific location in those lecture notes corresponding to selected text 414 may be caused to be surfaced in transcription pane 406.

Figure 5:
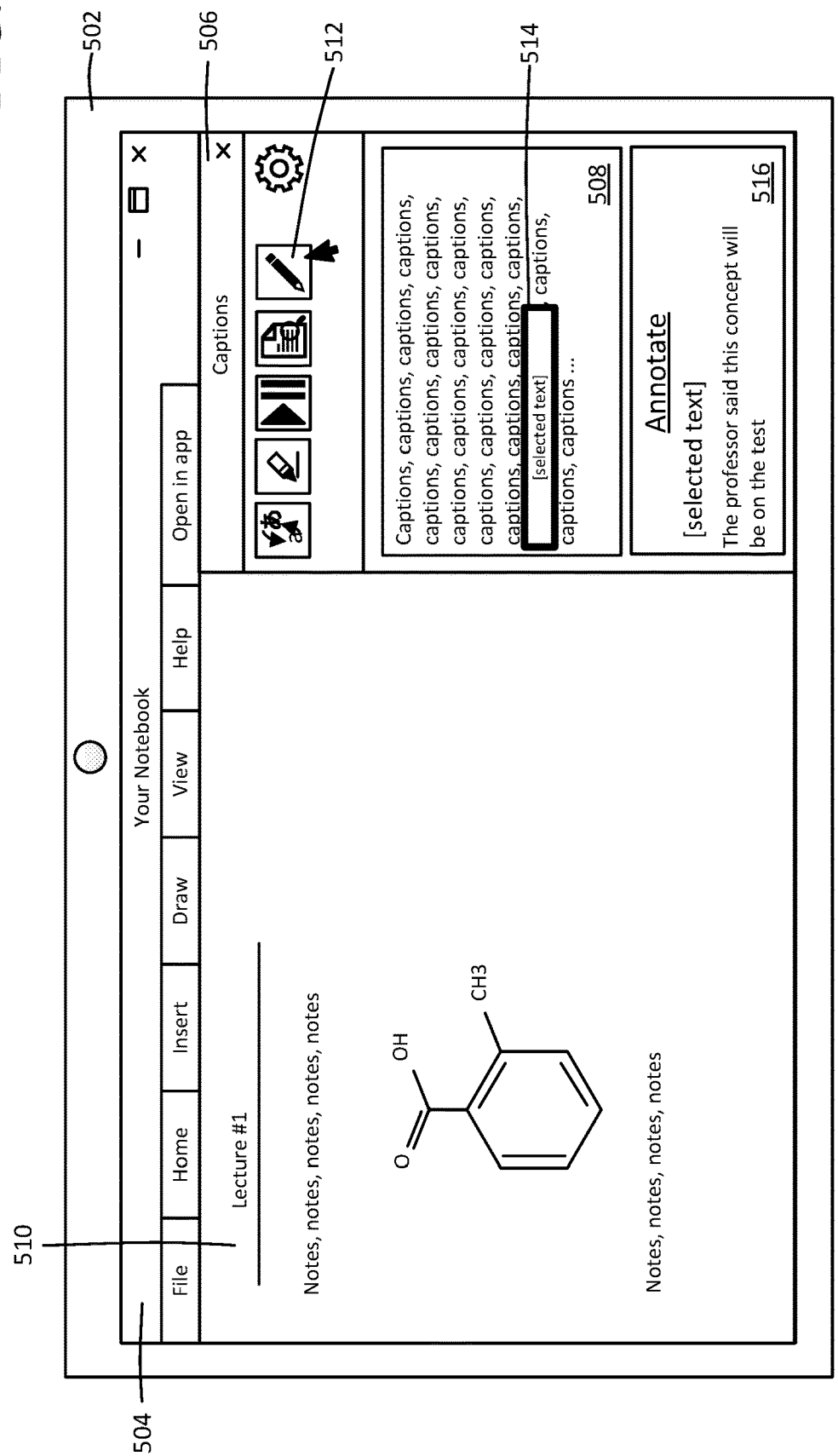
FIG. 5 illustrates the annotation of text in a transcription pane of a productivity application.

FIG. 5 illustrates the annotation of text in a transcription pane of a productivity application. FIG. 5 includes computing device 502, which displays productivity application 504. Productivity application 504 includes application notes 510 and transcription pane 506. Transcription pane 506 is integrated in productivity application 504 and includes captions 508. Captions 508 are surfaced in real or almost real-time in relation to the receiving of speech (e.g., via an audio signal) and subsequent processing of that audio signal into text. The text is then caused to be displayed as captions 508 in transcription pane 506.

In this example, a selection has been made of one or more words in captions 508. Those one or more words are illustrated as selected text 514. A subsequent selection is then received in relation to annotation element 512 in transcription pane 506. In this example, the selection is made via a mouse click on annotation element 512. However, other selection mechanisms are contemplated (e.g., touch input, voice input, etc.). Upon selection of annotation element 512, annotation window 516 is caused to be displayed in transcription pane 506. Annotation window 516 provides a mechanism for a user to leave notes that will be associated with selected text. In this example, a user adds the text "The professor said this concept will be on the test" in annotation window 516 with selected text 514. In some examples, after associating an annotation with selected text, when an input is received next to the corresponding caption/ selected text in the transcription pane, the annotation may be automatically surfaced (e.g., in annotation window 516 or in in a separate window or pane). In additional examples, after associating an annotation with selected text, if the selected text is then inserted into application notes 510, a user may interact with the inserted text, which may cause the annotation to be automatically surfaced in relation to the inserted text in application notes 510.

Figure 6:
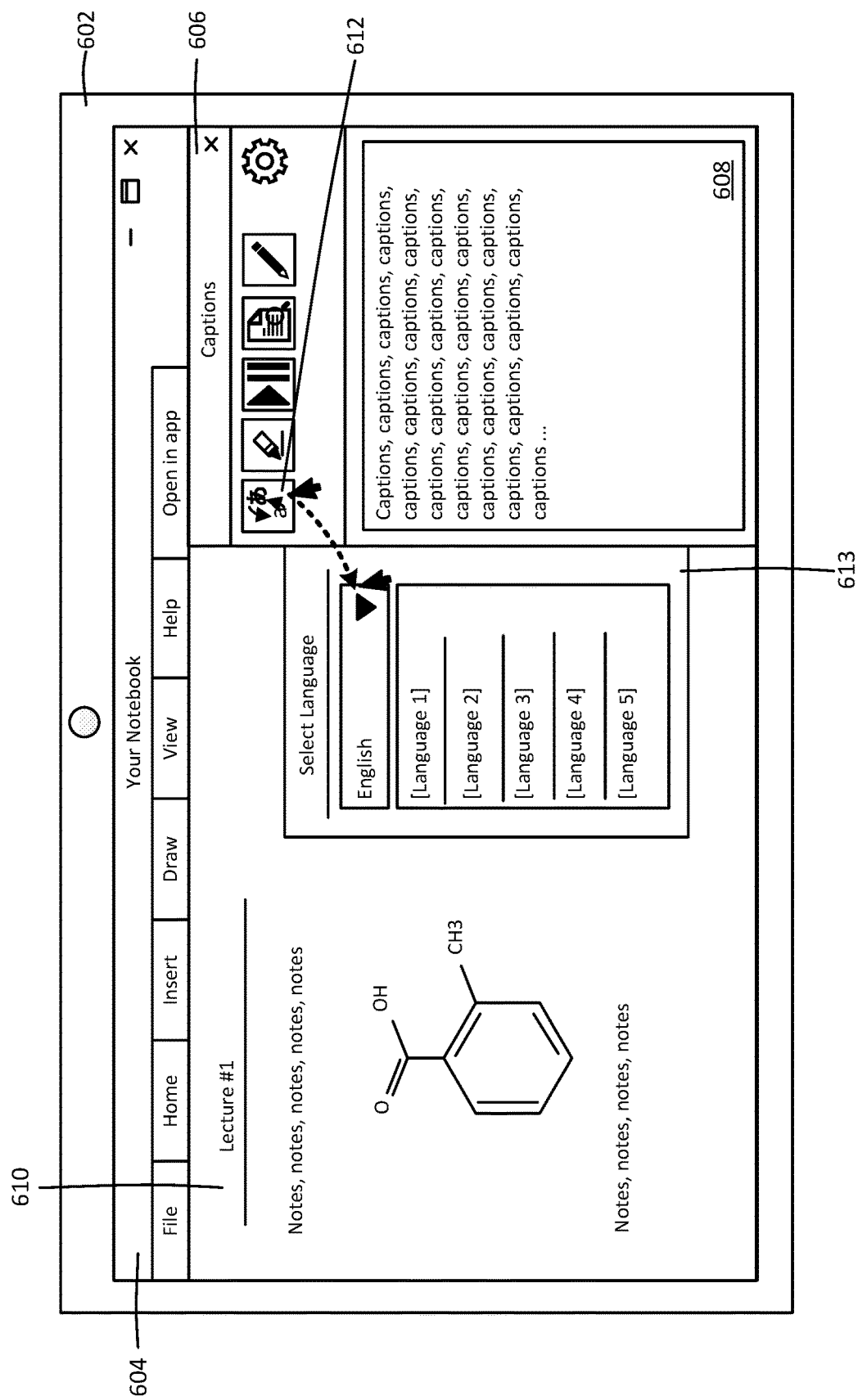
FIG. 6 illustrates selectable elements for changing the language that a transcription of real-time speech-to-text is surfaced in for a transcription pane.

FIG. 6 illustrates selectable elements for changing the language that a transcription of real-time speech-to-text is surfaced in for a transcription pane. FIG. 6 includes computing device 602, which displays productivity application 604. Productivity application 604 includes application notes 610 and transcription pane 606. Transcription pane 606 is integrated in productivity application 604 and includes captions 608. Captions 608 are surfaced in real or almost real-time in relation to the receiving of speech (e.g., via an audio signal) and subsequent processing of that audio signal into text. The text is then caused to be displayed as captions 608 in transcription pane 606.

In this example, a selection has been made of translation language element 612 in transcription pane 606. In this example, the selection is made via a mouse click on translation language element 612. However, other selection mechanisms are contemplated (e.g., touch input, voice input, etc.). Upon selection of translation language element 612, a plurality of selectable elements for modifying the language that captions 608 are surfaced in is caused to be displayed. In this example the plurality of selectable elements is surfaced in language fly-out window 613, however other user interface elements are contemplated (e.g., pop-up window, drop down list, etc.). A selection may be made of any of the languages included in language fly-out window 613, which may cause captions 608 to be surfaced in transcription pane 606 in that selected language.

Figure 7A:
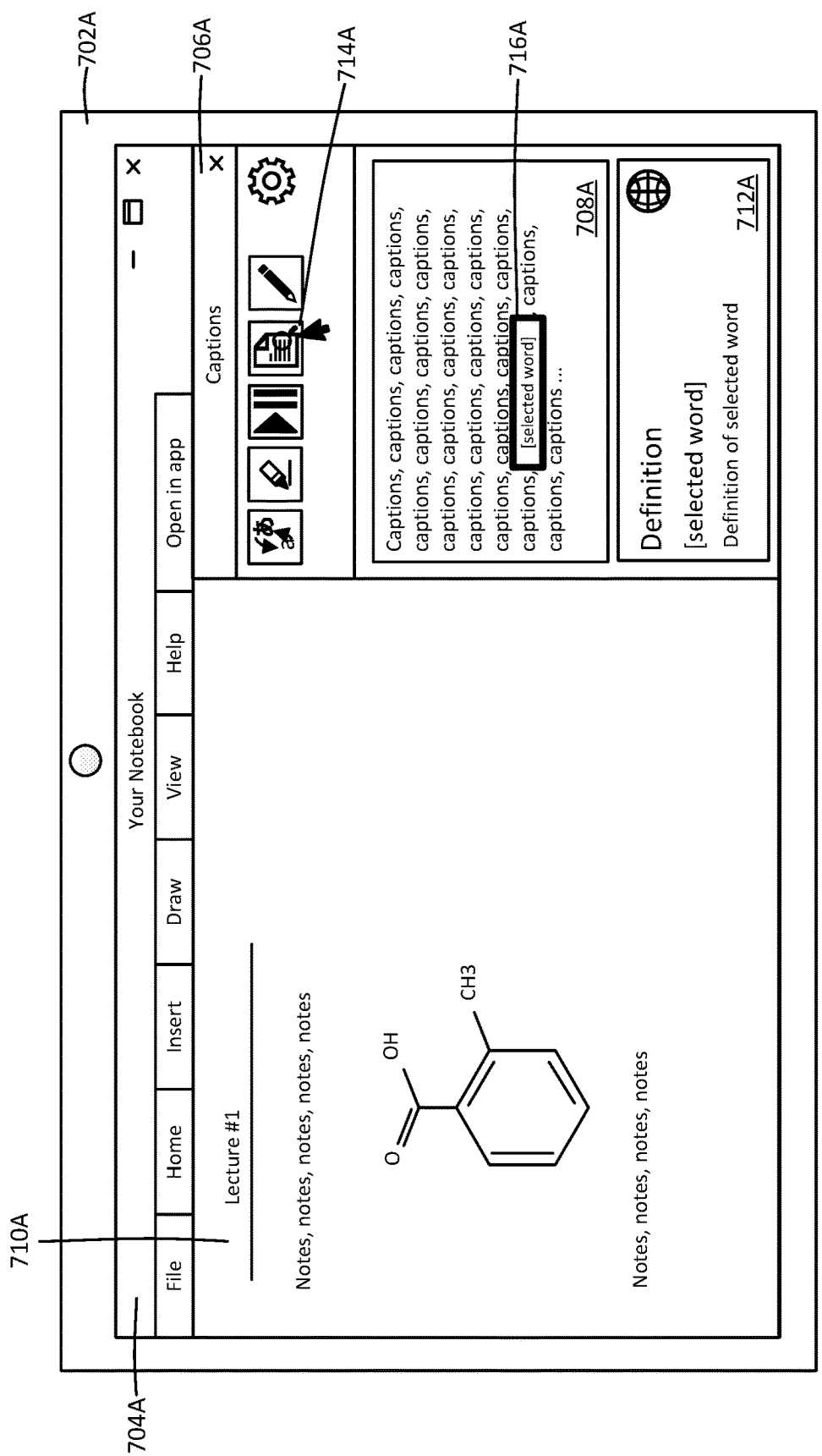
FIG. 7A illustrates a selectable element for surfacing definitions for words and/or phrases included in a transcription pane of a productivity application.

FIG. 7A illustrates a selectable element for surfacing definitions for words and/or phrases included in a transcription pane of a productivity application. FIG. 7A includes computing device 702A, which displays productivity application 704A. Productivity application 704A includes application notes 710A and transcription pane 706A. Transcription pane 706A is integrated in productivity application 704A and includes captions 708A. Captions 708A are surfaced in real or almost real-time in relation to the receiving of speech (e.g., via an audio signal) and subsequent processing of that audio signal into text. The text is then caused to be displayed as captions 708A in transcription pane 706A.

In this example, a selection has been made of a word in captions 708A. That word is selected word 716A. A subsequent selection is then received in relation to dictionary lookup element 714A in transcription pane 706A. In this example, the selection is made via a mouse click on dictionary lookup element 714A. However, other selection mechanisms are contemplated (e.g., touch input, voice input, etc.). Upon selection of dictionary lookup element 714A, a definition window 712A is caused to be displayed in transcription pane 706A. A definition for selected word 716A may be caused to be automatically displayed in definition window 712A upon selection of dictionary lookup element 714A. In some examples, the definition may be obtained from a standard dictionary that is local to computing device 702A or that is accessed via the web. In other examples, if the selected word is determined to be within a custom dictionary associated with a language processing model for the transcription, the definition may be obtained from that custom dictionary. For example, some words (especially relating to the sciences) may not be included in standard dictionaries, and those words may therefore be included in custom dictionaries that have been generated for a lecture, a set of lectures, and/or a scholastic discipline for a university, for example. In additional examples, if a determination is made that the captions are related to a particular field (e.g., computer science, chemistry, biology), the definition that is surfaced in definition window 712A may be obtained from a technical dictionary for that field that is obtained over the web. In additional examples, a first definition for a selected word may be obtained from a standard dictionary, a second definition for a selected word may be obtained from a technical and/or custom dictionary, and both definitions may be surfaced in definition window 712A.

In some examples, a selection may be made to associate one or more definitions from definition window 712A with selected word 716A. If such a selection is made, the one or more definitions may be caused to be displayed when an interaction with the word is received (e.g., definitions may be surfaced in transcription pane 706A if interaction is received with selected word 716A in captions 708A, definitions may be surfaced in application notes 710A if selected word 716A has been inserted in application notes 710A and the interaction is received in relation to the word in application notes 710A).

Figure 7B:
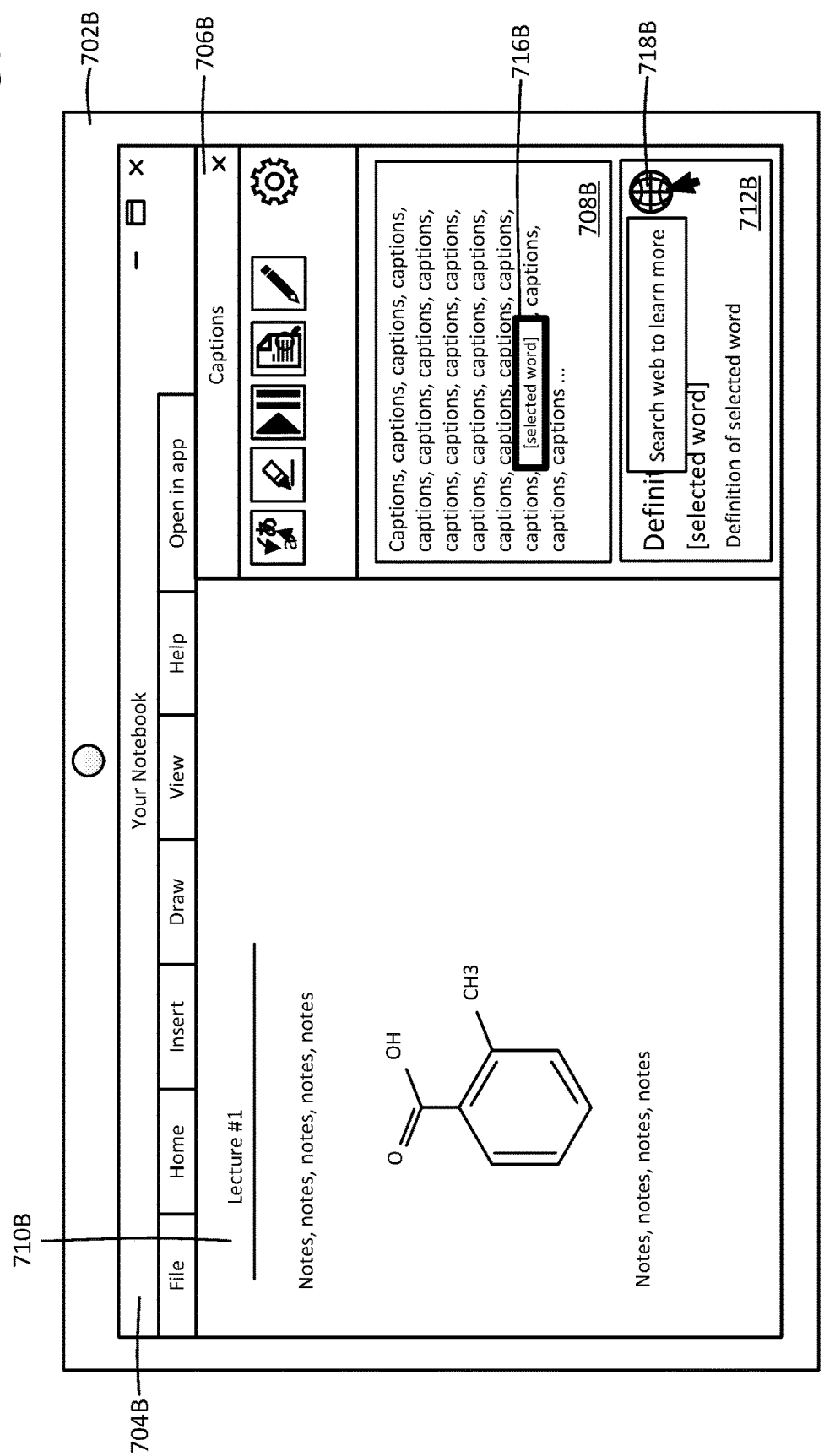
FIG. 7B illustrates a selectable element for causing a web search to be performed in association with words and/or phrases included in a transcription pane of a productivity application.

FIG. 7B illustrates a selectable element for causing a web search to be performed in association with words and/or phrases included in a transcription pane of a productivity application. FIG. 7B includes computing device 702B, which displays productivity application 704B. Productivity application 704B includes application notes 710B and transcription pane 706B. Transcription pane 706B is integrated in productivity application 704B and includes captions 708B. Captions 708B are surfaced in real or almost real-time in relation to the receiving of speech (e.g., via an audio signal) and subsequent processing of that audio signal into text. The text is then caused to be displayed as captions 708B in transcription pane 706B.

In this example, a selection has been made of a word in captions 708B. That word is selected word 716B. A subsequent selection is then received in relation to the dictionary lookup element in transcription pane 706A as described in relation to FIG. 7B. The definition for selected word 716B is thus caused to be surfaced in definition window 712B. However, in this example, a further selection is made of web search element 718B. By selecting web search element 718B, a web search may be performed related to selected word 716B and/or its surrounding text in captions 708B, and information from one or more online sources that are identified as being relevant to that search may be caused to be surfaced in relation to selected word 716B in captions 708B and/or in relation to definition window 712B. In some examples, the content obtained from the web may be associated with the one or more words in captions 708B. In such examples, the web content may be automatically surfaced when the one or more words are interacted with (e.g., via a mouse hover, via a left mouse click, etc.).

FIG. 8 illustrates selectable elements and related actions associated with the pausing and resuming of real-time speech-to-text captions in a transcription pane of a productivity application. FIG. 8 includes three transcription panes (transcription pane 802A, transcription pane 802B, transcription pane 802C), all of which are the same transcription pane at various stages of the pause/resume operations. The transcription panes are illustrated outside of a productivity application. However, it should be understood that the transcription panes illustrated herein may be integrated in a productivity application (e.g., in a pane adjacent to a note taking window).

The captions (captions 806A, captions 806B, captions 806C) are surfaced in real or almost real-time in relation to the receiving of speech (e.g., via an audio signal) and subsequent processing of that audio signal into text. The text is then caused to be displayed in captions 806A. However, transcription pane 802A includes a plurality of selectable user interface elements on its upper portion, and selection has been made of pause/resume element 804A. In this example, the selection is made via a mouse click on pause/resume element 804A. However, other selection mechanisms are contemplated (e.g., touch input, voice input, etc.).

Upon selection of pause/resume element 804A, the captions may cease to be surfaced in real time in captions 806A. For example, although audio is still concurrently being received by the real-time speech-to-text service, and a computing device displaying transcription pane 802A is still connected to a current transcription instance for that audio, captions transcribed from the audio after the selection of pause/resume element 804A may not be displayed in captions 806A. Rather, those captions may be stored in temporary storage (e.g., in buffer storage on a computing device associated with transcription pane 802A, on a server computing device hosting the real-time speech-to-text service) until a subsequent "resume" selection is made of pause/resume element 804A.

In this example, when a selection is made of pause/resume element 804A, captions 806A are paused at current speaker speech location 808A. As such, as illustrated by transcription pane 802B, even when additional audio from the speaker has been received (via the computing device that receives the audio) by the real-time speech-to-text service and transcribed, as indicated by current speaker speech location 808B, that content is not surfaced in location 810 where it would be surfaced if not for the selection of pause/resume element 804A having been received. However, when a subsequent selection of pause/resume element 804B is made in transcription pane 802C, the captions that were held in a temporary storage state (e.g., a buffer state) may be automatically surfaced, as indicated by the captions moving forward/being surfaced up to current speaker speech location 808C in captions 806C.

Additionally, although none of the transcription panes are illustrated with a scroll bar, it should be understood that the captions may be scrolled through while they are being surfaced or while they are in a paused state. A user might, for example, pause the surfacing of the captions, scroll up to something the user missed during an ongoing lecture, resume the surfacing of the captions, and scroll to the currently active state in the captions. Other mechanisms for moving forward or backwards in the captions are contemplated. For example, a user may utilize voice commands to position the captions (e.g., "go back five minutes" "jump back to [concept A] in the lecture"). In the case of voice commands, natural language processing may be performed on a received command/audio, and one or more tasks identified via that processing may be executed, the result of which may be surfaced in the transcription pane.

Figure 9A:
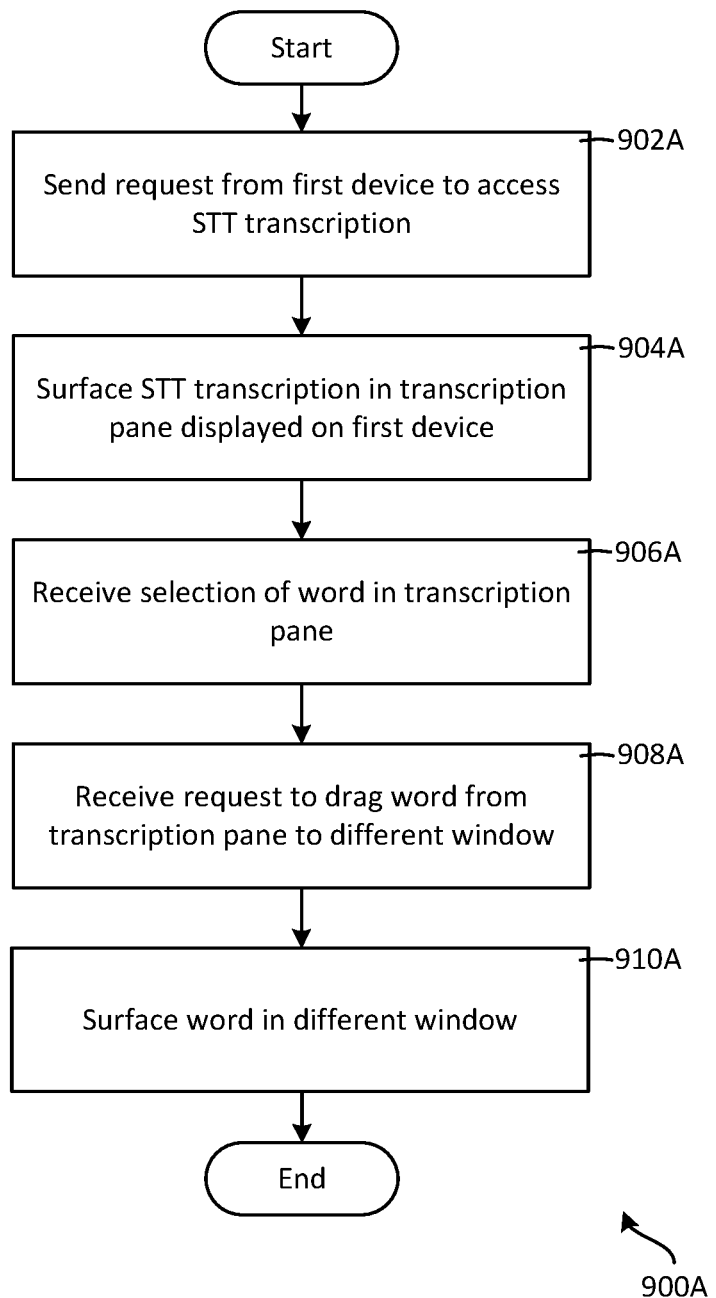
FIG. 9A is an exemplary method for integrating speech-to-text transcription in a productivity application.

FIG. 9A is an exemplary method 900A for integrating speech-to-text transcription in a productivity application. The method 900A begins at a start operation and flow moves to operation 902A.

At operation 902A a request to access a real-time speech-to-text transcription of an audio signal that is currently being received by a second device is sent by a first device. That is, the second device is associated with a speaking user. In some examples, the second device may have been utilized to request that a join code be generated for a transcription instance associated with the audio. The request to generate the join code may be received from a speech-to-text application on the second device, a translation application on the second device, or productivity application on the second device, for example.

The request to generate the join code may be received by a real-time speech-to-text service and the join code may be generated. The join code may comprise a QR code, a barcode, one or more characters, an encrypted signal, etc. In some examples, the request to access the real-time speech-to-text transcription may comprise receiving the join code from the first device. In other examples, when a request to access the real-time speech-to-text transcription is received, the first device may then surface a field for input of a join code. Regardless, once the join code is entered on the first device (e.g., in a productivity application, in a pop-up window), the first device may join the transcription instance associated with the speaking user.

From operation 902A flow continues to operation 904A where the real-time speech-to-text transcription is caused to be surfaced in a transcription pane of a productivity application user interface on the first device. The productivity application may comprise a note taking application, a word processing application, a presentation application, a spreadsheet application, and/or a task completion application, for example.

From operation 904A flow continues to operation 906A where a selection of the word in the surfaced transcription is received. The selection may comprise a highlighting of the word, an underlining, a copy input, and/or and electronic grab, for example. The input of the selection may be made via a mouse input, a touch input, a stylus input, and/or a verbal input.

From operation 906A flow continues to operation 908A where a request to drag the word from the transcription pane and drop it in a window in the productivity application outside of the transcription pane is received. In some examples, the word may be copied to temporary storage when the drag is initiated, and the word may be pasted from temporary storage to a location in the productivity application where the drop was initiated. In other examples, the word may be directly copied from the transcription pane and pasted at the location in the productivity application where the drop was initiated (e.g., not copied to temporary storage first). In some examples, the location in the productivity application where the word is dropped may comprise a notes section related to the subject matter of the transcription. In additional examples, one or more language processing models may be applied to the transcription and a determination may be made as to a subject matter type that the transcription relates to. In such examples, the productivity application may surface one or more saved notes that relate to the subject matter of the transcription.

From operation 908A flow continues to operation 910A where the word is caused to be surfaced in the window in the productivity application outside of the transcription pane. In some examples, the word may be automatically associated with a link. The link, if accessed, may cause the portion of the transcription that includes the word to be surfaced. In other examples, the link, if accessed, may cause one or more notes associated with the word to be surfaced.

From operation 910A flow moves to an end operation and the method 900A ends.

Figure 9B:
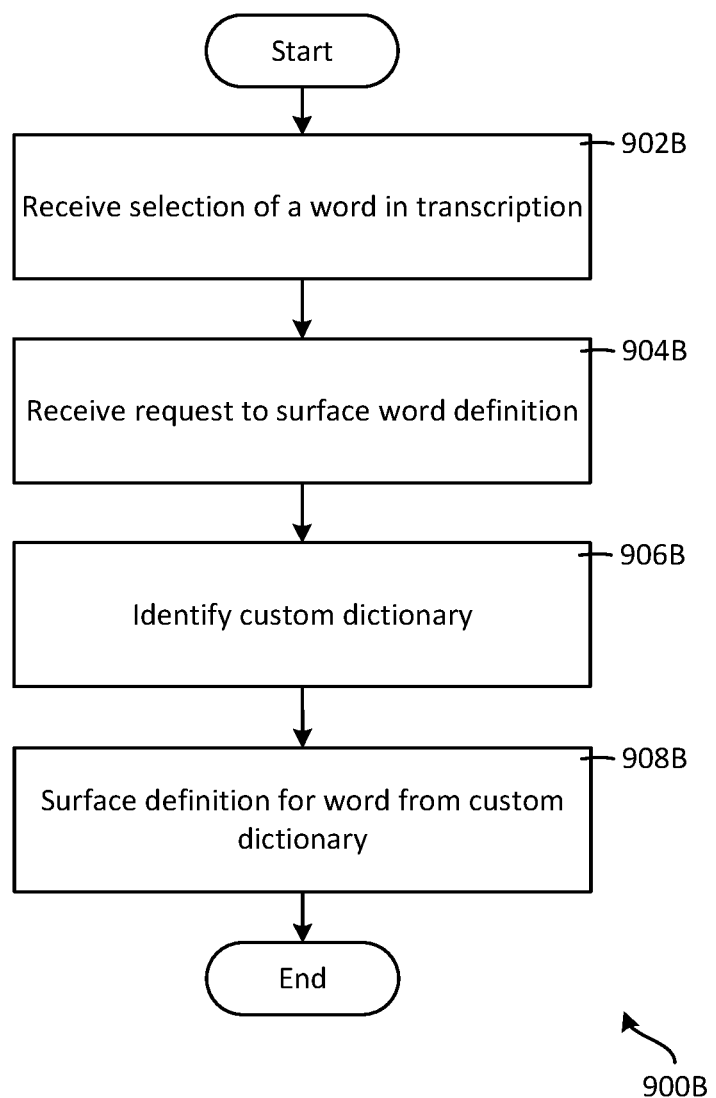
FIG. 9B is an exemplary method for surfacing definitions for words and/or phrases included in a transcription pane of a productivity application from a custom dictionary.

FIG. 9B is an exemplary method 900B for surfacing definitions for words and/or phrases included in a transcription pane of a productivity application from a custom dictionary. The method 900B begins at a start operation and flow moves to operation 902B.

At operation 902B a selection of a word in a transcription surfaced in a transcription pane of a productivity application is received. The transcription may be surfaced as part of a real-time speech-to-text transcription instance as described above in relation to FIG. 9A.

From operation 902B flow continues to operation 904B where a request to cause a definition for the second word to be surfaced in the productivity application user interface is received. The request may comprise selection of a dictionary icon in the transcription pane. In other examples, a right mouse click and dictionary lookup process may be utilized to request the definition. Other mechanisms are contemplated.

From operation 904B flow continues to operation 906B where a custom dictionary associated with a user account associated with the speaking user is identified. The custom dictionary may have been generated at least in part based on analyzing one or more documents associated with the speaking user (e.g., the speaking user's account). Those one or more documents may include lecture notes and/or presentation documents that are presented in association with the current speech and transcription instance. In other examples, the custom dictionary may be associated with a department of a university and/or group in an organization.

From operation 906B flow continues to operation 908B where a definition for the word from the custom dictionary is caused to be surfaced in the productivity application user interface.

From operation 908B flow moves to an end operation and the method 900B ends.

Figure 9C:
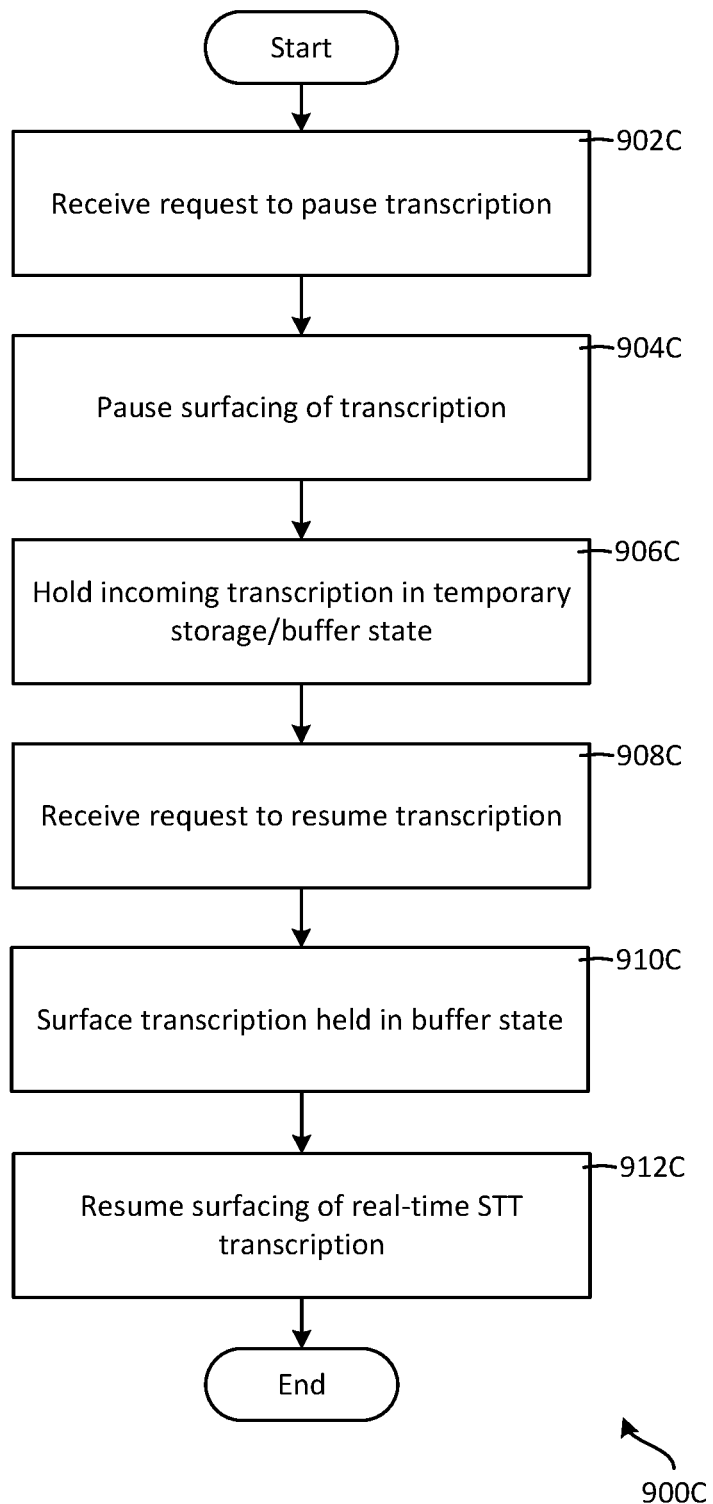
FIG. 9C is an exemplary method for pausing and resuming real-time speech-to-text captions in a transcription pane of a productivity application.

FIG. 9C is an exemplary method 900C for pausing and resuming real-time speech-to-text captions in a transcription pane of a productivity application. The method 900C begins at a start operation and flow moves to operation 902C.

At operation 902C a request to pause a real-time speech-to-text transcription may be received. That is, captions may be continuously added to the transcription in a transcription pane of a productivity application when a user is speaking, and a user may select an option in the productivity application to pause the surfacing of the captions.

From operation 902C flow continues to operation 904C where the surfacing of the real-time speech-to-text transcription in the transcription pane is paused. That is, although speech may still be in the process of being received and processed by the real-time speech-to-text service, the surfacing of additional captions in the transcription pane may be halted during the pause.

From operation 904C flow continues to operation 906C where an incoming real-time speech-to-text transcription is held in a buffer state on the receiving device while the real-time speech-to-text transcription is paused. That is, in this example, the speech and subsequent transcription/captions that are processed by the real-time speech-to-text service for the current transcription instance are held in temporary storage during the pause. The transcription may be held in temporary storage on a server device (e.g., a server device associated with the real-time speech-to-text service) and/or the device that the pause command was initially received at.

From operation 906C flow continues to operation 908C where a request to resume the real-time speech-to-text transcription is received.

From operation 908C flow continues to operation 910C where the real-time speech-to-text transcription that was held in the buffer state is caused to be surfaced in the transcription pane. That is, all of the captions that were held in temporary storage while the pause was in effect may be caused to be automatically surfaced in the transcription pane with the previously surfaced captions.

From operation 910C flow continues to operation 912C where the surfacing of the real-time speech-to-text transcription is resumed in the transcription pane. Thus, captions that are generated by the real-time speech-to-text service from the time that the transcription is resumed from its pause state may be once again continuously surfaced in the transcription pane.

From operation 912C flow moves to an end operation and the method 900C ends.

Figure 10:
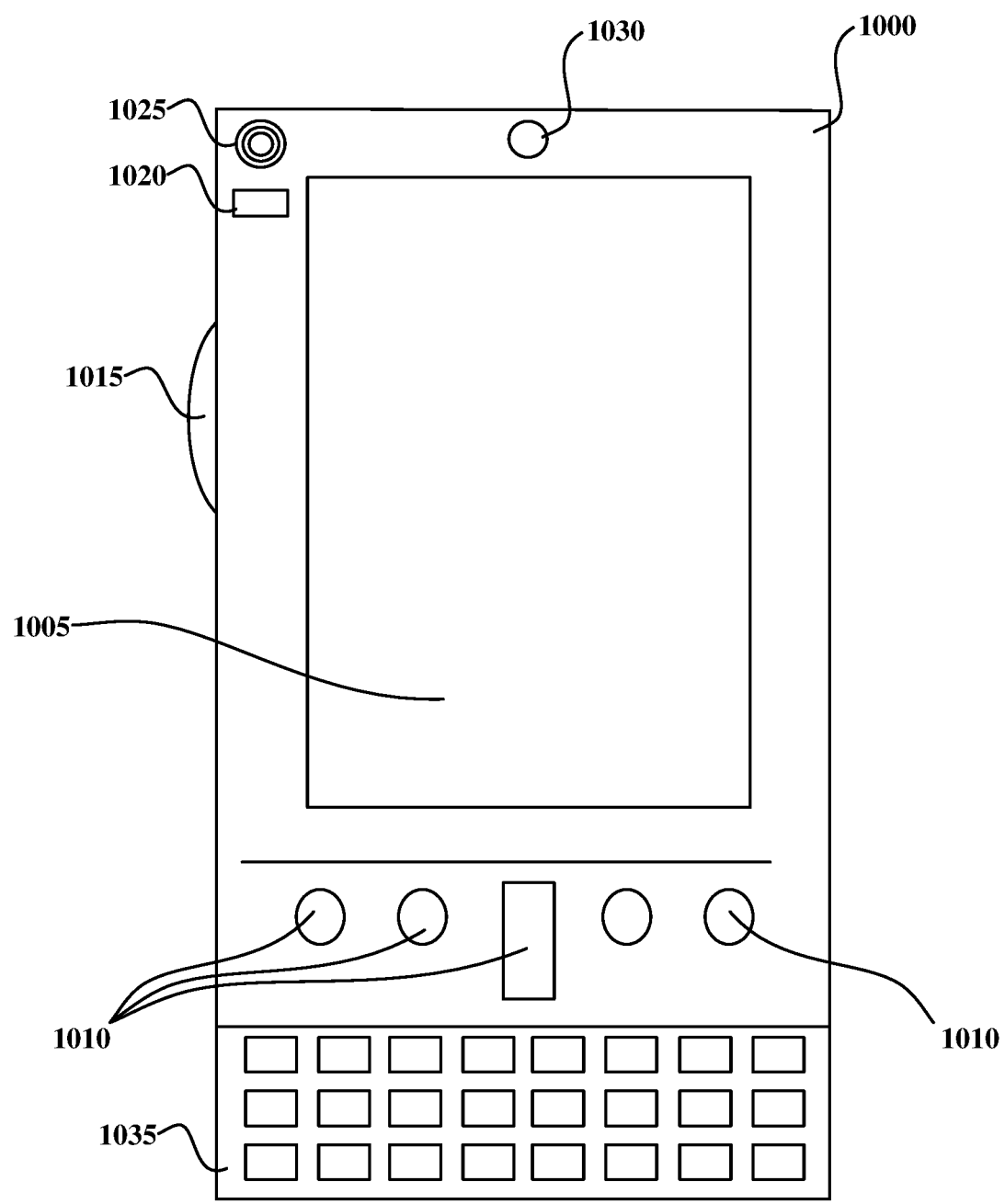
FIGS. 10 and 11 are simplified diagrams of a mobile computing device with which aspects of the disclosure may be practiced.
Figure 11:
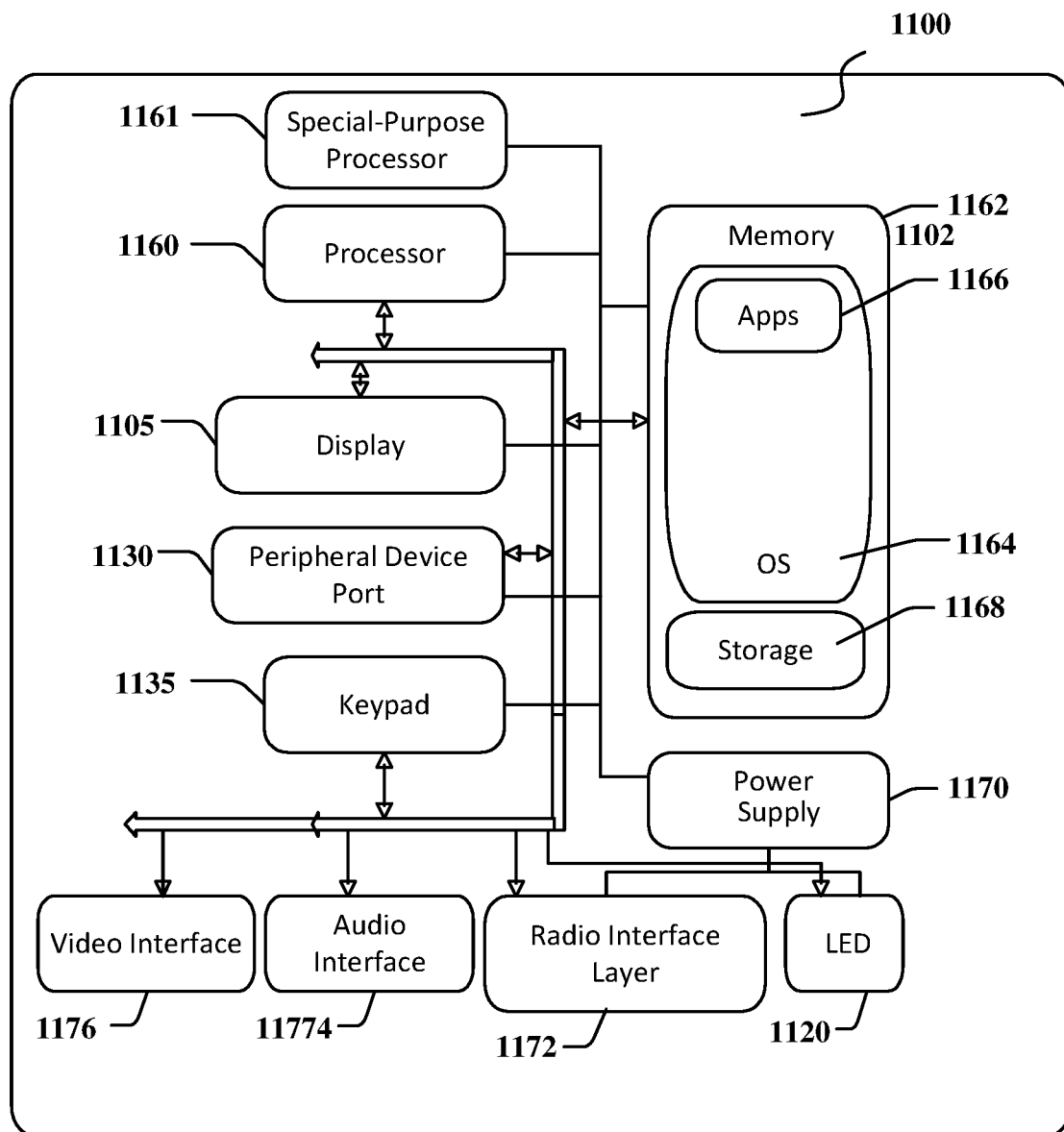

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a real-time speech-to-text platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
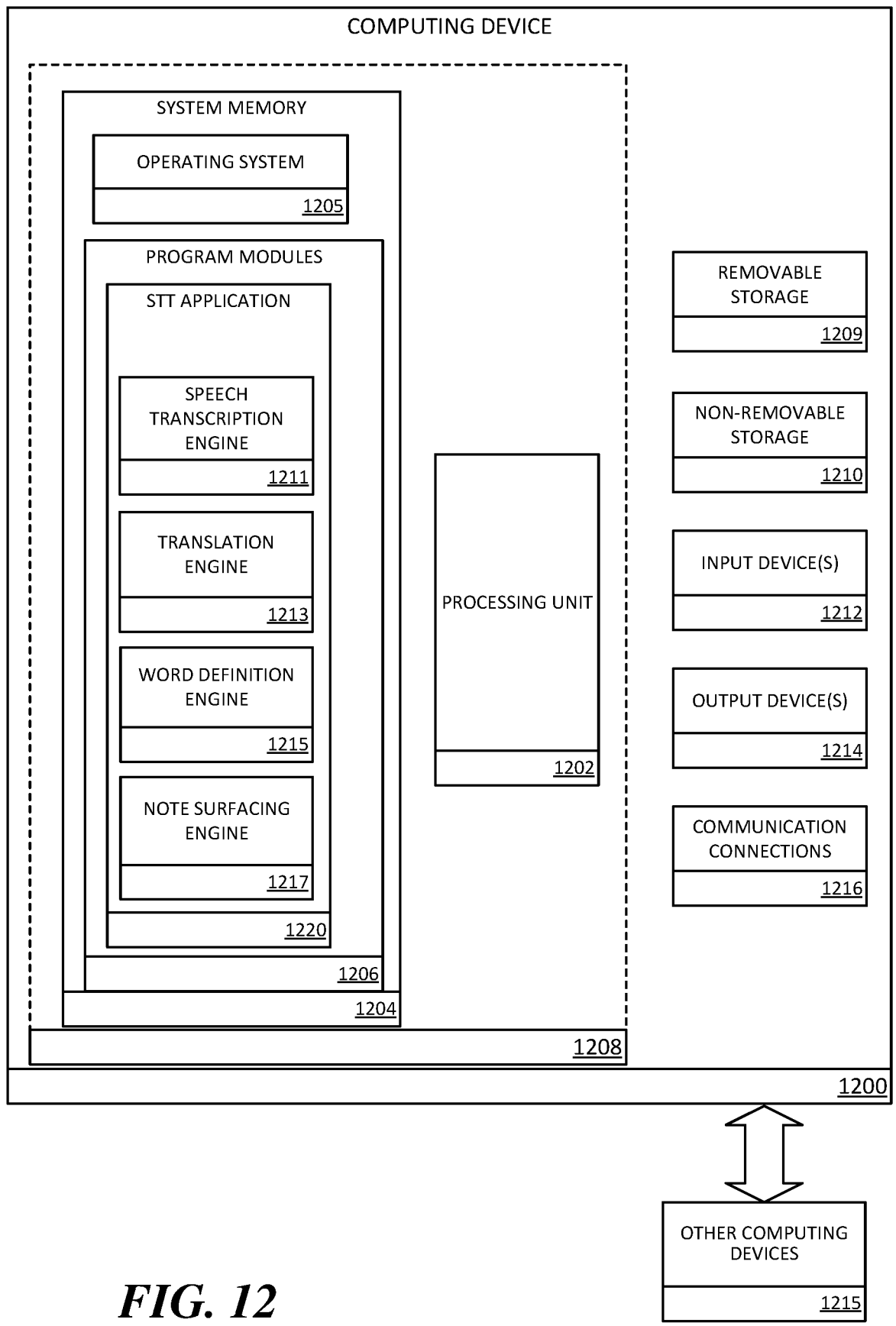
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for generating, surfacing and providing operations associated with real-time speech-to-text transcriptions and translations. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more productivity applications. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., speech transcription engine 1220) may perform processes including, but not limited to, the aspects, as described herein. According to examples, speech transcription engine 1211 may perform one or more operations associated with receiving audio signals and converting those signals to transcriptions that may be surfaced in a productivity application. Translation engine 1213 may perform one or more operations associated with translating a transcription in a first language to one or more additional languages. Word definition engine 1215 may perform one or more operations related to associating a definition or notes from a notebook application with a word included in a transcription in a transcription pane. Note surfacing engine 1217 may perform one or more operations associated with analyzing a transcription (e.g., utilizing natural language processing and/or machine learning), identifying a relevant section of a notebook application related to the transcription, and automatically surfacing that section of the notebook application.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
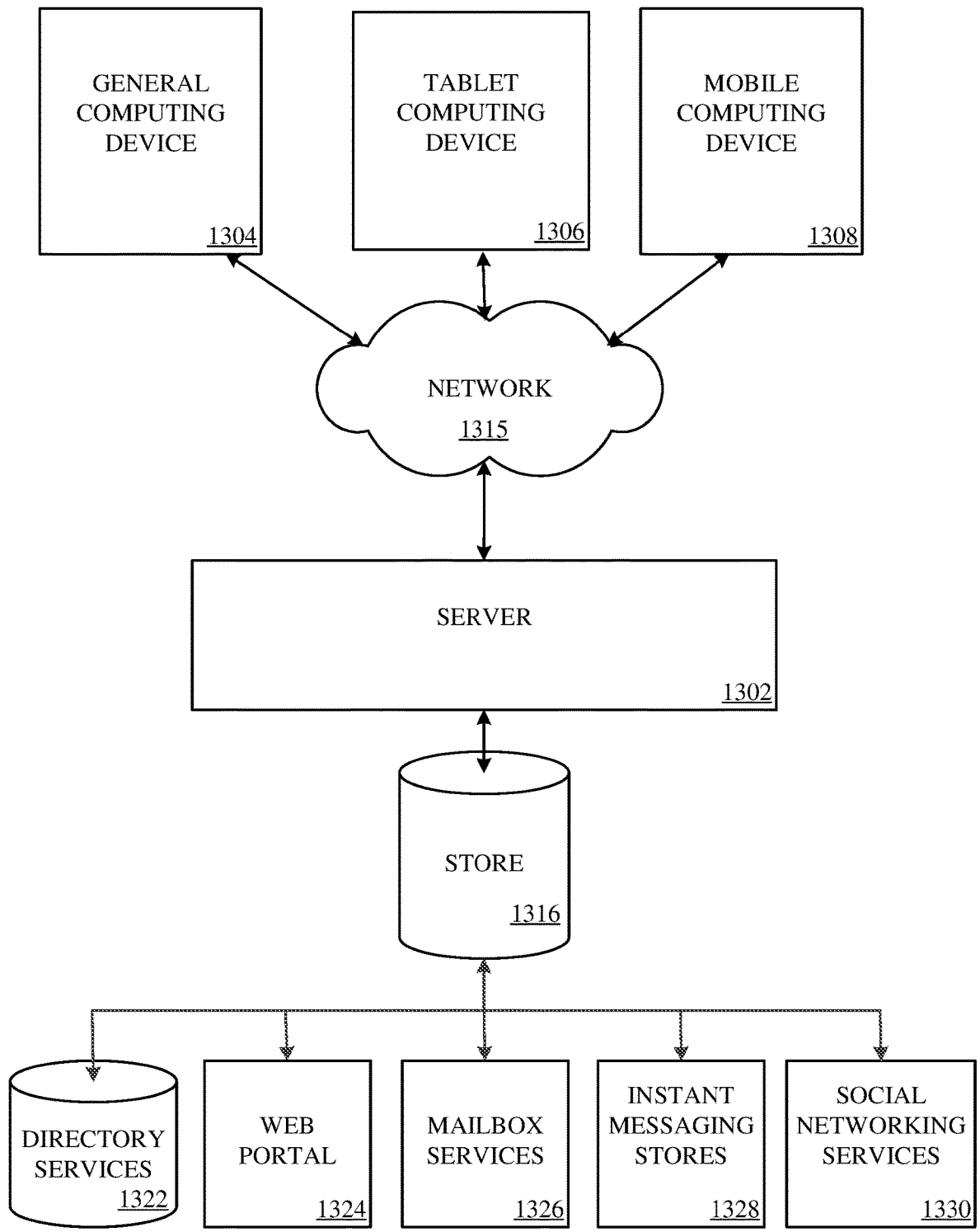
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for integrating speech-to-text transcription in a productivity application, the computer-implemented method comprising:
   sending, by a first device, a request to access a real-time speech-to-text transcription of an audio signal that is currently being received by a second device;
   causing the real-time speech-to-text transcription to be surfaced in a transcription pane of a productivity application user interface on the first device;
   receiving a selection of a word in the surfaced transcription;
   receiving a request to cause a definition for the word to be surfaced in the productivity application user interface;
   identifying a custom dictionary associated with a user account of the second device; and
   causing a definition for the word from the custom dictionary to be surfaced in the productivity application user interface.

2. The computer-implemented method of claim 1, wherein the request to access the real-time speech-to-text transcription comprises a join code.

3. The computer-implemented method of claim 2, wherein the join code provides access to the real-time speech-to-text transcription for any computing device that provides it to a real-time speech-to-text transcription service receiving the audio signal.

4. The computer-implemented method of claim 1, further comprising:
   receiving a selection of a second word in the surfaced transcription;
   receiving a request to drag the second word from the transcription pane and drop it in a window in the productivity application outside of the transcription pane; and
   causing the second word to be surfaced in the window in the productivity application outside of the transcription pane.

5. The computer-implemented method of claim 1, wherein the custom dictionary is generated, at least in part, based on analyzing a document presented by the second computing device while the audio signal is being received by the second device.

6. The computer-implemented method of claim 5, wherein analyzing the document comprises:
   applying a neural network that has been trained to identify topical subject matter to the document.

7. The computer-implemented method of claim 1, further comprising:
   receiving a selection of a second word in the surfaced transcription;
   receiving a request to cause a definition for the second word to be surfaced in the productivity application user interface;
   determining that the second word cannot be located in the custom dictionary; and
   causing a selectable option to perform a web search for the second word to be surfaced.

8. The computer-implemented method of claim 1, further comprising:
   receiving a selection of a second word in the surfaced transcription;
   receiving a request to associate an annotation with the second word in the productivity application user interface; and
   associating the annotation with the second word in the productivity application user interface.

9. The computer-implemented method of claim 1, further comprising:
   receiving a request to translate the transcription from a first language that the audio signal is initially transcribed in to a second language; and
   causing the real-time speech-to-text transcription to be surfaced in the transcription pane in the second language.

10. The computer-implemented method of claim 1, further comprising:
    receiving a request to pause the real-time speech-to-text transcription;
    pausing the surfacing of the real-time speech-to-text transcription in the transcription pane;
    holding an incoming real-time speech-to-text transcription in a buffer state on the first device while the real-time speech-to-text transcription is paused;
    receiving a request to resume the real-time speech-to-text transcription;
    causing the real-time speech-to-text transcription that was held in the buffer state to be surfaced in the transcription pane; and
    resuming the surfacing of the real-time speech-to-text transcription in the transcription pane.

11. A system for integrating speech-to-text transcription in a productivity application, comprising:
    a memory for storing executable program code; and
    one or more processors, functionally coupled to the memory, the one or more processors being responsive to computer-executable instructions contained in the program code and operative to:
      send, by a first device, a request to access a real-time speech-to-text transcription of an audio signal that is currently being received by a second device;
      cause the real-time speech-to-text transcription to be surfaced in a transcription pane of a productivity application user interface on the first device;
      receive a request to cause a definition for the word to be surfaced in the productivity application user interface;
      identify a custom dictionary associated with a user account of the second device; and
      cause a definition for the word from the custom dictionary to be surfaced in the productivity application user interface.

12. The system of claim 11, wherein the request to access the real-time speech-to-text transcription comprises a join code.

13. The system of claim 11, wherein the one or more processors are further responsive to the computer-executable instructions contained in the program code and operative to:
    receive a selection of a second word in the surfaced transcription;
    receive a request to drag the second word from the transcription pane and drop it in a window in the productivity application outside of the transcription pane; and cause the second word to be surfaced in the window in the productivity application outside of the transcription pane.

14. The system of claim 11, wherein the one or more processors are further responsive to the computer-executable instructions contained in the program code and operative to:
generate the custom dictionary based on analyzing a document presented by the second computing device while the audio signal is being received by the second device.

15. The system of claim 11, wherein the one or more processors are further responsive to the computer-executable instructions contained in the program code and operative to:
receive a selection of a second word in the surfaced transcription;
receive a request to associate an annotation with the second word in the productivity application user interface; and
associate the annotation with the second word in the productivity application user interface.

16. The system of claim 11, wherein the one or more processors are further responsive to the computer-executable instructions contained in the program code and operative to:
apply a machine learning model to the surfaced transcription, wherein the machine learning model has been trained to classify text into subject matter types;
classify the surfaced transcription as a subject matter type;
receive an indication to save the surfaced transcription; and
automatically save the surfaced transcription in a location corresponding to the subject matter type.

17. The system of claim 11, wherein the one or more processors are further responsive to the computer-executable instructions contained in the program code and operative to:
receive a request to pause the real-time speech-to-text transcription;
pause the surfacing of the real-time speech-to-text transcription in the transcription pane;
hold an incoming real-time speech-to-text transcription in a buffer state on the first device while the real-time speech-to-text transcription is paused;
receive a request to resume the real-time speech-to-text transcription;
cause the real-time speech-to-text transcription that was held in the buffer state to be surfaced in the transcription pane; and
resume the surfacing of the real-time speech-to-text transcription in the transcription pane.

18. A computer-readable storage device comprising executable instructions that, when executed by one or more processors, assist with integrating speech-to-text transcription in a productivity application, the computer-readable storage device including instructions executable by the one or more processors for:
sending, by a first device, a request to access a real-time speech-to-text transcription of an audio signal that is currently being received by a second device;
causing the real-time speech-to-text transcription to be surfaced in a transcription pane of a productivity application user interface on the first device;
receiving a selection of a word in the surfaced transcription;
receiving a request to cause a definition for the word to be surfaced in the productivity application user interface;
identifying a custom dictionary associated with a user account of the second device; and
causing a definition for the word from the custom dictionary to be surfaced in the productivity application user interface.

19. The computer-readable storage device of claim 18, wherein the instructions are further executable by the one or more processors for:
receiving a selection of a second word in the surfaced transcription;
receiving a request to transfer the second word from the transcription pane and to a window in the productivity application outside of the transcription pane; and
causing the second word to be automatically surfaced in the window in the productivity application outside of the transcription pane.

20. The computer-readable storage device of claim 18, wherein the instructions are further executable by the one or more processors for:
receiving a request to pause the real-time speech-to-text transcription;
pausing the surfacing of the real-time speech-to-text transcription;
holding an incoming real-time speech-to-text transcription in a buffer state on the first device while the real-time speech-to-text transcription is paused;
receiving a request to resume the real-time speech-to-text transcription;
causing the real-time speech-to-text transcription that was held in the buffer state to be surfaced in the transcription pane; and
resuming the surfacing of the real-time speech-to-text transcription in the transcription pane.

* * * * *